(12) United States Patent
Cagney et al.

(10) Patent No.: US 6,581,495 B2
(45) Date of Patent: Jun. 24, 2003

(54) BALANCER SHAFT

(75) Inventors: John L. Cagney, DownersGrove, IL (US); James P. Burke, Bolingbrook, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 09/768,764

(22) Filed: Jan. 23, 2001

(65) Prior Publication Data

US 2001/0029919 A1 Oct. 18, 2001

Related U.S. Application Data

(60) Provisional application No. 60/178,178, filed on Jan. 26, 2000.

(51) Int. Cl.$^7$ .............................. F16F 15/26; F16C 3/20
(52) U.S. Cl. ................... 74/603; 123/192.2; 464/180
(58) Field of Search .................. 74/603, 604; 464/180; 123/192.2

(56) References Cited

U.S. PATENT DOCUMENTS

| | | | |
|---|---|---|---|
| 3,511,110 A | * | 5/1970 | Grieve .................... 123/192.2 |
| 4,688,528 A | | 8/1987 | Nivi et al. |
| 4,819,505 A | | 4/1989 | Takubo et al. |
| 5,038,731 A | | 8/1991 | Shihmada |
| 5,253,547 A | | 10/1993 | Yoneyama et al. |
| 5,375,571 A | * | 12/1994 | Diehl et al. ............... 123/192.2 |
| 5,483,932 A | | 1/1996 | Friedman et al. |
| 5,537,968 A | | 7/1996 | Takahashi |
| 5,857,388 A | | 1/1999 | Killion et al. |
| 5,875,753 A | | 3/1999 | Ishikawa |
| 5,893,346 A | | 4/1999 | Hosoya |
| 6,189,499 B1 | | 2/2001 | Iwata et al. |
| 6,237,442 B1 | * | 5/2001 | Killion ........................ 74/603 |

FOREIGN PATENT DOCUMENTS

JP 11-101311 * 4/1999 ............ F16F/15/26

* cited by examiner

*Primary Examiner*—William C Joyce
*Assistant Examiner*—Timothy McAnulty
(74) *Attorney, Agent, or Firm*—Dennis Kelly Sullivan; Susan L. Lukasik; Jeffrey P. Calfa

(57) ABSTRACT

There is provided an apparatus for a reduced mass balancer shaft that effectively balance first or second order imbalances in an internal combustion engine. The balancer shaft is symmetrical with offset masses that are equal in magnitude and opposite in direction and orientation, and preferably comprises front and rear offset masses between a center section and a front and a rear journal respectively. In a preferred embodiment, there integrally formed stiffening members in the front and rear offset masses that symmetric about the balancer shaft centerline. The front and rear offset masses are each comprised of solid partial annular configurations that extend equally away from the balancer shaft centerline. The center section is comprised of an annular configuration.

19 Claims, 3 Drawing Sheets

BALANCER SHAFT

This patent application claims the benefit of Provisional U.S. patent application Ser. No. 60/178,178 filed on Jan. 26, 2000.

FIELD OF THE INVENTION

This invention relates generally to balancers for internal combustion engines. More particularly, this invention relates to balancer shafts of a novel configuration.

BACKGROUND OF THE INVENTION

The use of balance shafts in an internal combustion engine is well known in the prior art. A balance shaft is a counterweighted shaft, typically driven by the crankshaft either directly or through a mechanical link. As a result, the balance shaft balances out first or second order forces and/or moments in a reciprocating machine, e.g., a typical internal combustion engine, encountered during operation of the engine.

There is a myriad of well known balance shaft designs used in the industry to address imbalances. Typically, the prior art balancer shafts are solid bars or beams, solid steel beams, or tube designs that have a solid half-circle or semi-circular cross-section with a certain thickness that runs the length of the balance shaft. However, these balancer shafts designs result in higher mass quantities, which lead to greater overall engine weight and production costs. The higher balancer shaft mass is undesirable to engine design and the higher weight also adversely affects engine performance characteristics.

There is a thus a need for a reduced mass balancer shaft that will effectively balance first or second order imbalances in an internal combustion engine, thereby decreasing overall engine mass.

SUMMARY OF THE INVENTION

The present invention provides a reduced mass balancer shaft that effectively balance first or second order engine imbalances in an internal combustion engine. The reduced mass balancer shaft decreases overall engine mass. The balancer shaft is symmetrical with offset masses that are equal in magnitude and opposite in direction and orientation. The balancer shaft preferably comprises a front offset mass between a front journal and a center section, and a rear offset mass between the center section and a rear journal. In a preferred embodiment, there are two integrally formed stiffening members with the front and rear offset masses respectively and symmetric about the balancer shaft centerline. The front and rear offset masses are each comprised of partial annular configurations that extend a degree range of about 165 to 195 degrees, and where the front and rear offset mass extend equally away from the balancer shaft centerline. The center section is comprised of an annular configuration.

The following drawings and description set forth additional advantages and benefits of the invention. More advantages and benefits will be obvious from the description and may be learned by practice of the invention.

DETAILED DESCRIPTION OF THE INVENTION

Figure 1:
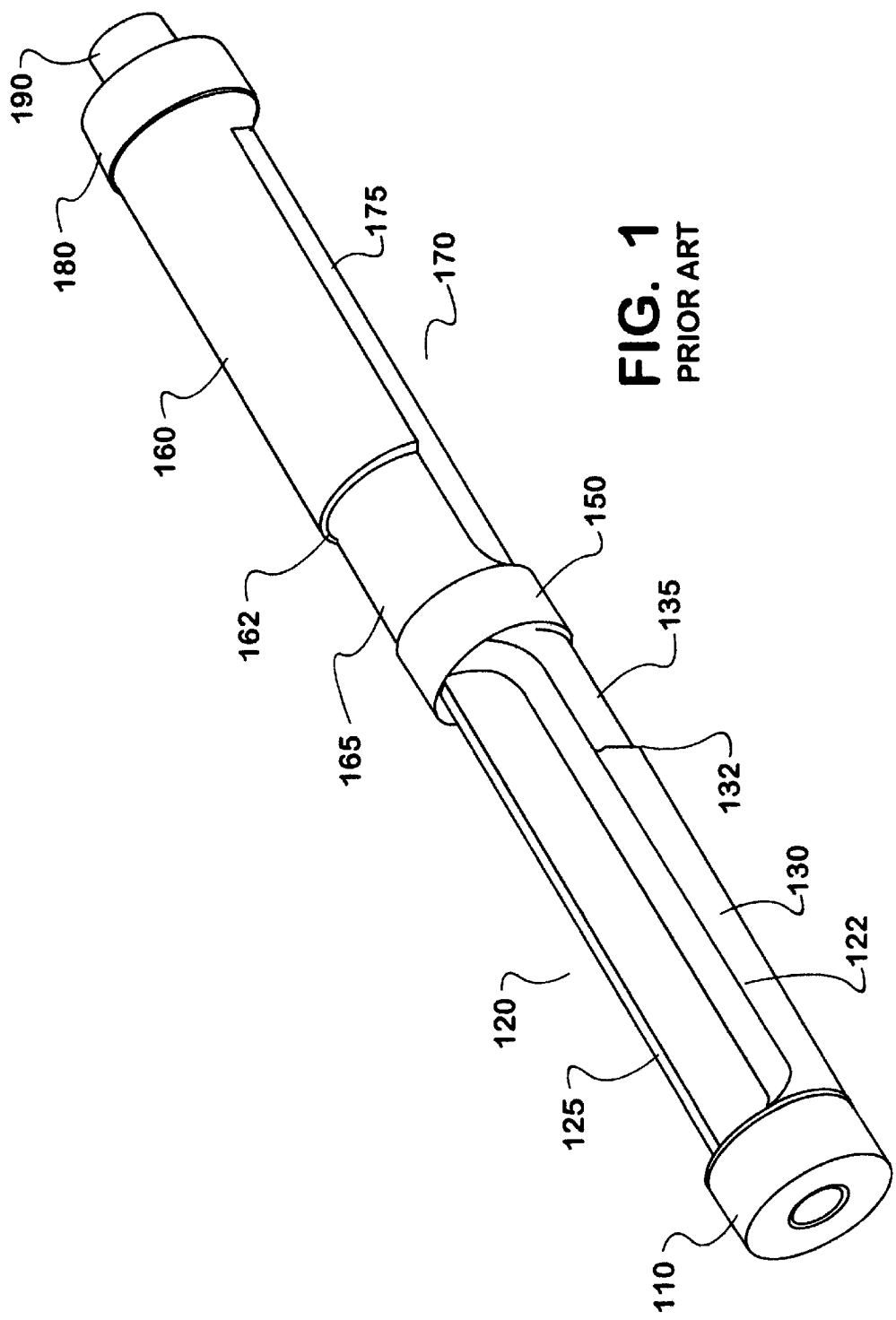
FIG. 1 shows an isometric view of a prior art balance shaft design.

FIG. 1 illustrates an isometric view of a typical prior art balance shaft 100. The balance shaft 100 has a configuration that is substantially a solid cylindrical shaft. The balance shaft 100 is symmetrical with offset masses 120 and 170 about a center section 150 between a front journal 180 and a rear journal 110. The offset masses 120 and 170 are equal in mass magnitude and opposite in orientation relative to each other. The balance shaft 100 is typically supported by a suitable bearing surface (not shown) on either journal 110 and 180 of the balancer shaft 100. The front journal 180 is further cooperatively and indirectly connected to the crankshaft through a gear train connector member 190 such that the balance shaft 100 rotates or operates as intended.

The front offset mass 170 is essentially configured of a solid half circle 165 from the center section 150 to the front journal 180. The front offset mass 170 has additional mass 160 on the outside edge of the solid half circle 165 from the front journal 180 to a point 132 short of the center section 150. Further, the front offset mass 170 has a stiffening rib section 175 from the center section 150 to the front journal 180. The rib section 175 is typically situated on the flat face (shown clearer in the rear offset mass 120) of the front solid half circle 165, and is centered and parallel with respect to a center line (not shown) of the balance shaft 100. The rib section 170 primarily functions to maintain the stiffness of the shaft to during operation in an engine.

The rear offset mass 120 is essentially identical to the front offset mass 170, except that the rear offset mass 120 has an opposite orientation. The rear offset mass 120 has a solid half circle 135 configuration 165 from the center section 150 to the rear journal 110 with an additional mass 130 on the outside of the solid half circle 135 from the rear journal 110 to a point 132 short of the center section 150. There is also a stiffening rib section 125 from the center section 150 to the rear journal 110 situated on the flat face 122 of the front solid half circle 135. The rib section 125 is centered and parallel with respect to a centerline (not shown) of the balance shaft 100, and also primarily functions to maintain the stiffness of the shaft during engine operation.

As a result of this configuration, the offset masses 120 and 170 of the balance shaft 100 will each have respective centers of gravity from the center section 150 that are equal and oppositely located on the balance shaft 100. The prior art balance shaft 100 can thus offset first or second order imbalances encountered during operation of an internal combustion engine.

Figure 2:
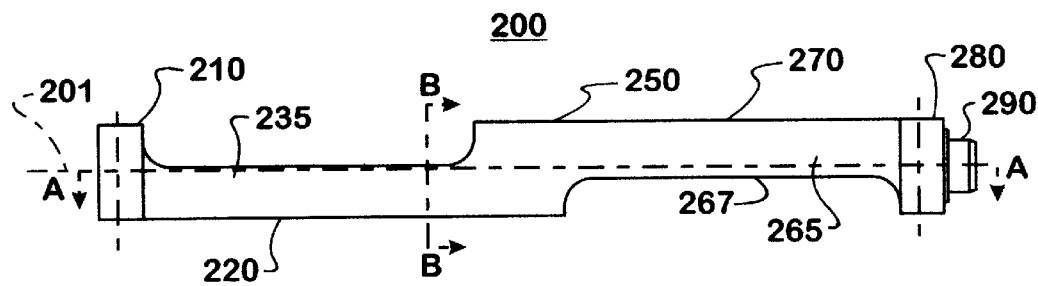
FIG. 2 shows a front view of an embodiment of a balancer shaft according to the present invention.

FIG. 2 shows a front view of an embodiment of a balancer snart iuu according to the present invention. The balancer shaft 200 of the present invention functions to offset first or second order imbalances or moments encountered during operation of an internal combustion engine. The balancer shaft 200 has a novel configuration that is substantially different from the prior art solid half-circle shaft of FIG. 1. The mass of the solid half-circle 135 and 165 is now a partial annulus or hollow partial annulus 235 and 265. The mass and strength requirements of the balancer shaft 200 are optimized by configuring a hollowed section 300 that runs the length of the balancer shaft 200.

In a preferred embodiment as shown in FIG. 2 internal stiffening members or ribs 305, 310, 325, 330 (shown in FIG. 3) are used. In this embodiment, the internal stiffening members 305, 310, 325, and 330 are located in such a fashion that the balancer shaft 200 mass is optimized. In this embodiment, the stiffening members 305, 310, 325, and 330 have a certain preferred shape (as will be described below). However, those of skill in the art will recognize that the balancer shaft 200 of the present invention can be configured to balance out first or second order imbalances with or without stiffening members, though they are used in the preferred embodiment shown in FIGS. 2–5. Those of skill in the art will also recognize that, when used, the stiffening members can be given a myriad of configurations that will allow the balancer shaft 200 to meet the balancing requirements of a particular engine application. For example, geometric, regular or irregular shapes will meet the balancing requirements.

The balancer shaft 200 shown in FIG. 2 generally has a solid half-circle cross-section with a hollow section 300 (shown in FIG. 3) that runs the length of the balancer shaft 200. Alternatively, the balancer shaft 200 is symmetrical with offset masses 220 and 270 about a center section 250 between a balancer shaft front journal 280 and a balancer rear journal 210. The offset masses 220 and 270 are equal in mass magnitude and opposite in orientation relative to each other. The balancer shaft 200 may be supported by a suitable bearing surface (not shown) on either journal 210 and 280 of the balancer shaft 200. The front journal 280 is further cooperatively and indirectly connected to the crankshaft through a gear train connector member 290 such that the balance shaft 200 rotates and operates as intended.

The balancer shaft 200 is an integral piece that is essentially comprised of two oppositely oriented offset masses 220 and 270 located between a center section 250 and respective front and rear journals 210 and 280. The balancer shaft 200 configuration is such there is an interior hollow section running the length of the shaft 200. The balancer shaft's novel configuration, along with the hollow interior, is preferably cast through the use of molds and an appropriately configured casting core or a similar process such as lost foam.

The front balancer offset mass 270 is essentially configured of a partial annulus or hollow partial annulus 265 from the center section 250 to the balancer front journal 280. The hollow partial annulus 265 is symmetrical with respect to a balancer shaft 200 centerline 201, and depending on the particular engine application, the hollow partial annulus 265 extends an angle A1 (shown in FIG. 5) that has a degree range of about 165 degrees to 195 degrees. Viewed another way, the hollow partial annulus 265 extends an angle A2 (shown in FIG. 5) that is ±15° above or below a z-axis 205 plane on both sides of the centerline 201, where the x-axis is aligned and parallel to the centerline 201, and the y-axis 204 is vertical and perpendicular to x-axis 203. The particular degree range extended by the hollow partial annulus 265 will depend upon the balancing requirements for the particular engine application. In the preferred embodiment of FIG. 2, the hollow partial annulus 265 extends slightly greater than 180 degrees. The range extended by the hollow partial annulus 265 past the center line 201, in terms of angles A1 and A2, is best shown in the cross-sectional side view of FIG. 5, albeit for the opposite symmetric orientation of the rear balancer offset mass 235.

Further, in this preferred embodiment, the balancer front offset mass 270 comprises a pair of identical stiffening members or ribs 325 and 330 connected to the partial solid annulus 265. The stiffening members 325 and 330 have vertical and perpendicular orientation with the horizontal centerline 201 of the partial solid annulus 265. In this embodiment, the stiffening members 325 and 330 essentially form parallel vertical stiffening walls (505 and 510 shown in FIG. 5) that are flush with the partial solid annulus at the top (503 and 513 shown in FIG. 5). However, those of skill in the art will readily recognize that the stiffening members can have other configurations that will still allow the balancer shaft 200 to offset engine imbalances, e.g., other geometric or irregular shapes. The stiffening members 325 and 330 assist in obtaining good shaft stiffness of the balancer shaft 200 to counteract bending and torsional deflection encountered during engine operation. As mentioned previously, the balance shaft 200 can be configured without the stiffening members and still meet the balancing requirements.

The rear balancer offset mass 220 is symmetrically identical to the front balancer offset mass 270, except that the rear balancer offset mass 220 has an opposite orientation. The rear balancer offset mass 220 is also configured as a partial annulus or hollow partial annulus 235 from the center section 250 to the balancer rear journal 210. Again, depending on the particular engine application, the hollow partial annulus 235 extends an angle A1 (shown in FIG. 5) that has a degree range of about 165 degrees to 195 degrees. Put another way, the hollow partial annulus 235 extends an angle A2 that can be ±15° above or below a z-axis 205 plane (not shown) on both sides of the centerline 201, where the x-axis is aligned and parallel to the centerline 201, and the y-axis 204 is vertical and perpendicular to x-axis 203. The particular degree range extended by the hollow partial annulus 235 will depend upon the balancing requirements for the particular engine application. However, the degree range extended by the rear solid partial annuls 235 will be identical to that extended by the front hollow partial annulus 265 in order to meet the first or second order balancing requirements. Again, in the preferred embodiment of FIG. 2, the hollow partial annulus 235 extends slightly greater than 180 degrees. The degree range extended by the partial solid annulus 235 about the centerline 201, in terms of angles A1 or A2, is best shown in the cross-sectional side view of FIG. 5.

Because the balancer shaft 200 is symmetric, the balancer rear offset mass 220 also comprises a pair of identical stiffening members or ribs 305 and 310 connected to the partial annulus 235 in this embodiment. The stiffening members 305 and 310 preferably have a vertical and perpendicular orientation with respect to the horizontal centerline 201 of the partial solid annulus 235. In this embodiment, the stiffening members 305 and 310 form parallel vertical stiffening walls 505 and 510 (shown in FIG. 5) that are flush with the partial annulus at the top (503 and 513 in FIG. 5). However, those of skill in the art will readily recognize that the stiffening members can have other configurations that will still allow the balancer shaft 200 to offset engine imbalances, e.g., other geometric or irregular shapes. The stiffening members 305 and 310 assist in maintaining the stiffness of the balancer shaft 200 to counteract rotational stresses during engine operation. Again, the balance shaft 200 can be configured without the stiffening members and still meet the balancing requirements.

The novel configuration of the embodiment of the present in FIG. 2 will result in offset masses 220 and 270 of equal mass which are symmetrically and oppositely oriented on the balancer shaft 200. The offset masses 220 and 270 will each have respective centers of gravity away from the center section 250 that are equally and oppositely located on the balancer shaft 200 such that the balancing requirements are met. The balancer shaft 100 configuration of the present invention will effectively offset first or second order imbalances that are encountered during operation of an internal combustion engine. Also, because of the novel configuration of FIGS. 2–5, the balancer shaft 200 will require less mass than prior art balance shafts 100. The balancer shaft 200 configuration illustrated in FIGS. 2-5 will be about 20–30% lighter than typical prior art balance shafts 100 resulting in reduced over all engine weight, which leads to improved engine performance.

Figure 3:
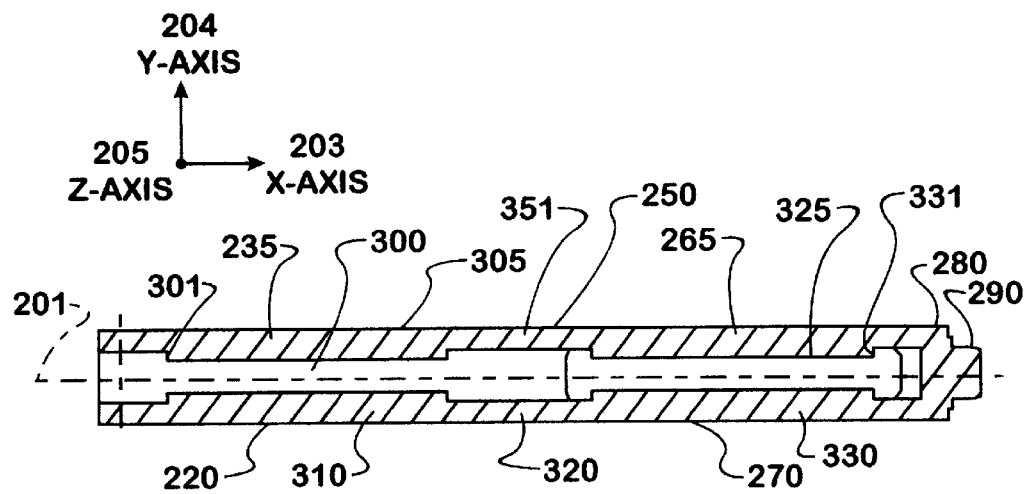
FIG. 3 shows a cross section view of the balancer shaft of FIG. 2 along the section line A—A.

FIG. 3 shows a cross sectional view of the balancer shaft of FIG. 2 along the section line A—A. FIG. 3 shows more clearly, that in the preferred embodiment, the vertical stiffening members 305, 310, 325 and 330 are integrally cast with the respective partial solid annulus 235 and 265 when the balancer shaft 200 is cast. In this embodiment, the front stiffening members, 325 and 330 extend lengthwise between the balancer front journal 280 and the balancer center 250 section on opposite sides of the centerline 201. The rear stiffening members 305 and 310 extend lengthwise, in a symmetric and opposite orientation with respect the front stiffening members 325 and 330, between the balancer rear journal 210 and the balancer center 250 section on opposite sides of the centerline 201.

FIG. 3 also shows in more detail the balancer shaft center section 250. In contrast to the front and rear offset masses 270 and 220, the center section 250 is configured as a solid annulus 320 with a predetermined thickness 251. In a preferred embodiment, the hollow partial annulus 265 and 235 of the front and rear offset masses 270 and 220 have the same thickness 301 and 331 as the thickness 351 of the center section 250 annulus 320. The thickness of the front and rear hollow partial annulus 265 and 235 will be such to meet the balancing requirements of the particular engine application involved. The front and rear hollow partial annulus 265 and 235 have an increased thickness 331 and 301 where the stiffening members 325, 330, 305 and 310, when used in this preferred embodiment, are located.

Figure 4:
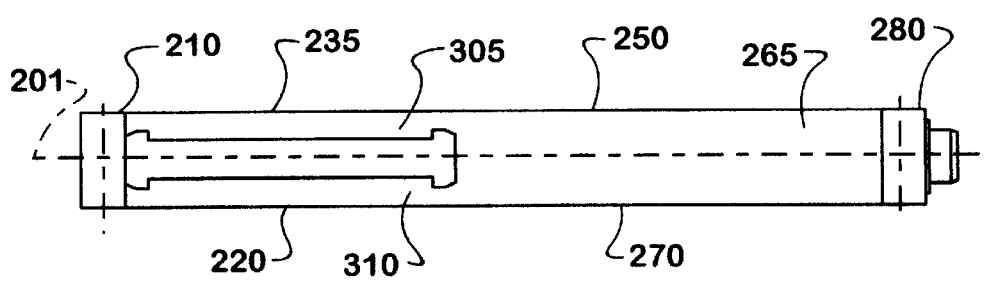
FIG. 4 shows a top view of the balancer shaft of FIG. 2.

FIG. 4 shows a top view of the balancer shaft of FIG. 2. There is shown the solid exterior of the front partial annulus 265. Also, shown is the open side of the rear partial annulus 235 of the symmetric and oppositely oriented rear balancer offset mass 220. Similar to FIG. 2, the rear stiffening members 305 and 310 are shown extending symmetrically lengthwise between the balancer rear journal 210 and the center 250 section on opposite sides of the centerline 201.

Figure 5:
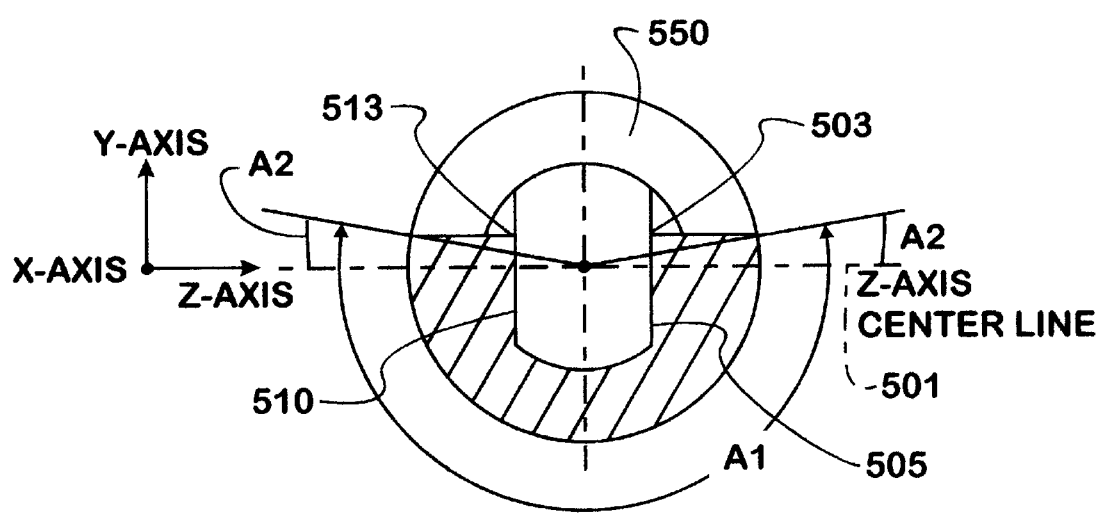
FIG. 5 shows a cross-section side view of the balancer shaft of FIG. 2 along the section line B—B.

FIG. 5 shows a cross-sectional side view of the balancer shaft of FIG. 2 along the section line B—B. The shape of the rear hollow partial annulus 235 is clearly shown In this section view. The rear hollow partial annulus 235 is also shown extending an angle A1, which can have a range of about 165 to 195 degrees. The rear hollow partial annulus 235 will extend past the z-axis center line 501 equally on both sides of the shaft centerline 201. Alternatively, the rear hollow partial annulus 235 will extend an angle A2 that is ±15° above or below a z-axis center line 501 equally on both sides of the shaft centerline 201. Further, the rear stiffening members 305 and 310, as configured in this embodiment, are clearly shown forming parallel vertical stiffening walls 505 and 510 and being flush with the partial solid annulus at the top 503 and 513. As mentioned previously, the stiffening members can have other regular or irregular configurations depending on the particular engine appiication involved. As mentioned previously, the balance shaft 200 can be configured without the stiffening members. Last, there is shown the top section 550 of the balancer shaft center section 250.

The invention has been described and illustrated with respect to certain preferred embodiments by way of example only. Those skilled in that art will recognize that the preferred embodiments may be altered or amended without departing from the true spirit and scope of the invention. Therefore, the invention is not limited to the specific details, representative devices, and illustrated examples in this description. The present invention is limited only by the following claims and equivalents.

We claim:

1. A balancer shaft for use in an internal combustion engine comprising:
    a front offset mass connected to a center section, said front offset mass comprising a partial annulus configuration defining a hollow interior portion opening in a direction toward a centerline of the shaft, wherein the front offset mass has a non-circular interior surface adjacent to the hollow interior portion;
    a rear offset mass connected to the center section, said rear offset mass comprising a partial annulus configuration defining a hollow interior portion opening in a direction toward a centerline of the shaft, wherein the rear offset mass has a non-circular interior surface adjacent to the hollow interior portion;
    wherein the balancer shaft is symmetrical with oppositely oriented front and rear offset masses of equal mass, thereby enabling the balancer shaft to effectively balance engine imbalances.

2. The balancer shaft of claim 1, wherein
    the front offset mass comprises at least one stiffening member; and
    the rear offset mass oomprises at least one stiffening member.

3. The balancer shaft of claim 2, wherein the front and rear offset masses extend equally away from the balancer shaft centerline.

4. The balancer shaft of claim 2, wherein the balancer shaft is cast as a single integral piece.

5. The balancer shaft of claim 1, wherein the front and rear offset masses each comprise an angle A1 that has a range of about 165 to 195 degrees.

6. The balancer shaft of claim 5, wherein the center section comprises an annular configuration.

7. The balancer shaft of claim 1, wherein the balancer shaft is cast using a casting core to form said hollow portion.

8. The balancer shaft of claim 1, wherein the interior surface of the front offset mass comprises a pair of planar walls adjacent to the hollow interior portion and wherein the interior surface of the rear offset mass comprises a pair of planar walls adjacent to the hollow interior portion.

9. The balancer shaft of claim 1, further comprising at least one stiffening member extending axially along a majority of a length of the front offset mass and at least one stiffening member extending axially along a majority of a length of the rear offset mass.

10. A balancer shaft for use in an internal combustion engine comprising:
    a front and a rear offset mass connected to a center section, said masses comprising a partial annulus configuration defining a hollow interior portion opening in a direction toward a centerline of the shaft;
    a pair of stiffening members integrally formed with the front and rear offset masses, wherein at least one stiffening member extends axially along a majority of a length of the front offset mass and at least one stiffening member extends axially along a majority of a length of the rear offset mass;
    wherein the balancer shaft is symmetric with oppositely oriented front and rear offset masses of equal mass, thereby enabling the balancer shaft to effectively balance engine imbalances.

11. The balancer shaft of claim 10, wherein the front and rear offset masses each comprise an angle A1 that has a range of about 165 to 195 degrees.

12. The balancer shaft of claim 11, wherein the center section comprises an annular configuration.

13. The balancer shaft of claim 10, wherein the front and rear offset masses extend equally away from the balancer shaft centerline.

14. The balancer shaft of claim 10, wherein the balancer shaft is cast as a single integral piece.

15. The balancer shaft of claim 14, wherein the balancer shaft is cast using a casting core to define said follow portion.

16. The balancer shaft of claim 10, wherein the pair of stiffening members comprise a pair of planar walls that are symmetric about the centerline of the shaft.

17. The balancer shaft of claim 10, wherein the front offset mass has a non-circular interior surface adjacent to the hollow interior portion and wherein the rear offset mass has a non-circular interior surface adjacent to the hollow interior portion.

18. A balancer shaft for use in an internal combustion engine comprising:

a front offset mass connected to a center section, the front offset mass comprising two stiffening members symmetric about a balancer shaft centerline, and a rear offset mass connected to the center section, the rear offset mass comprising two stiffening members symmetric about the balancer shaft centerline;

whereby the balancer shaft is symmetrical with oppositely oriented front and rear offset masses of equal mass, thereby enabling the balancer shaft to effectively balance engine imbalances.

19. A balancer shaft for use in an internal combustion engine comprising:

a front and rear offset mass connected to a center section, the front offset mass comprising two stiffening members symmetric about a balancer shaft centerline, and the rear offset mass comprising two stiffening members symmetric about the balancer shaft centerline; and wherein the stiffening members are integrally formed with the front and rear offset masses;

whereby the balancer shaft is symmetric with oppositely oriented front and rear offset masses of equal mass, thereby enabling the balancer shaft to effectively balance engine imbalances.

* * * * *